United States Patent
Petela et al.

(10) Patent No.: US 10,808,181 B2
(45) Date of Patent: Oct. 20, 2020

(54) FURNACE TUBE RADIANTS

(71) Applicant: NOVA Chemicals (International) S.A., Fribourg (CH)

(72) Inventors: Grazyna Petela, Calgary (CA); Leslie Wilfred Benum, Red Deer (CA); Jeffrey Stephen Crowe, Calgary (CA); Seyed Majid Hoseini, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 406 days.

(21) Appl. No.: 15/352,720

(22) Filed: Nov. 16, 2016

(65) Prior Publication Data
US 2017/0137722 A1    May 18, 2017

(30) Foreign Application Priority Data
Nov. 17, 2015  (CA) .................................... 2912061

(51) Int. Cl.
| | |
|---|---|
| *F28D 7/16* | (2006.01) |
| *C10G 9/20* | (2006.01) |
| *C10G 9/14* | (2006.01) |
| *F28F 9/20* | (2006.01) |
| *B01J 6/00* | (2006.01) |
| *B01J 19/24* | (2006.01) |

(Continued)

(52) U.S. Cl.
CPC .............. *C10G 9/203* (2013.01); *B01J 6/008* (2013.01); *B01J 19/2415* (2013.01); *C10G 9/14* (2013.01); *C10G 9/20* (2013.01); *C10G 9/206* (2013.01); *F28D 7/085* (2013.01); *F28F 9/20* (2013.01); *B01J 2219/0006* (2013.01); *B01J 2219/00155* (2013.01); *B01J 2219/00157* (2013.01); *B01J 2219/00166* (2013.01); *C10G 2300/10* (2013.01); *C10G 2300/1044* (2013.01); *C10G 2400/20* (2013.01); *F28D 2021/0059* (2013.01); *F28F 2009/0285* (2013.01); *Y02P 30/10* (2015.11)

(58) Field of Classification Search
CPC . C10G 9/20; C10G 9/36; F22B 37/244; B01J 2219/00076; F28D 2021/0056; F28D 7/16; F27D 1/0033; F27D 99/0035; F27B 9/068
See application file for complete search history.

(56) References Cited

U.S. PATENT DOCUMENTS

| | | | |
|---|---|---|---|
| 1,980,330 A | * | 11/1934 | Gard ........................ C10G 9/20 122/25 |
| 2,733,692 A | | 2/1956 | Sherman |

(Continued)

FOREIGN PATENT DOCUMENTS

DE        1601235 A1 *   5/1970  ............... B01J 6/00

OTHER PUBLICATIONS

Burke, Donald P. and Miller, Ryle; Ethylene—CW Report—Part 1: Part 1 (Oct. 23)looked at the big worldwide expansion in ethylene capacity and economics of the new plants. Part 2 deals with the technology that makes it all possible; Chemical Week, Nov. 13, 1965, pp. 70-81.

*Primary Examiner* — Gregory A Wilson
(74) *Attorney, Agent, or Firm* — Gary F. Matz

(57) ABSTRACT

A substantially linear ceramic or metallic radiant of ellipsoidal or polygonal cross section is placed proximate furnace tubes or coils in the radiant section of a fired heater to increase the radiant heat directed to the surface of the tubes or coils.

40 Claims, 11 Drawing Sheets

(51) Int. Cl.
*F28D 7/08* (2006.01)
*F28D 21/00* (2006.01)
*F28F 9/02* (2006.01)

(56) References Cited

U.S. PATENT DOCUMENTS

| | | | | |
|---|---|---|---|---|
| 3,259,110 A * | 7/1966 | Beggs | ............... | C10G 9/20 |
| | | | | 122/356 |
| 3,292,599 A * | 12/1966 | Zimmerman | ............ | C10G 9/20 |
| | | | | 122/510 |
| 3,614,073 A * | 10/1971 | Born | ............... | C10G 9/20 |
| | | | | 432/207 |
| 3,671,198 A | 6/1972 | Wallace | | |
| 4,013,402 A * | 3/1977 | Klein | ............... | F28D 7/024 |
| | | | | 122/250 R |
| 4,499,055 A | 2/1985 | DiNicolantonio et al. | | |
| 5,147,511 A * | 9/1992 | Woebcke | ............ | C10G 9/002 |
| | | | | 196/110 |
| 6,095,097 A * | 8/2000 | Gibson | ............. | F24H 9/0005 |
| | | | | 122/367.1 |
| 6,364,658 B1 * | 4/2002 | Ganeshan | ............ | F22B 37/106 |
| | | | | 165/181 |
| 6,436,202 B1 | 8/2002 | Benum et al. | | |
| 6,526,898 B1 * | 3/2003 | Ganeshan | ............ | F22B 37/10 |
| | | | | 110/322 |
| 7,194,963 B2 * | 3/2007 | Ganeshan | ............ | F22B 37/10 |
| | | | | 110/322 |
| 7,278,828 B2 | 10/2007 | Steplewski et al. | | |
| 7,718,052 B2 * | 5/2010 | Brewer | ............... | B01J 6/008 |
| | | | | 208/130 |
| 8,002,951 B2 * | 8/2011 | Spicer | ............... | B01J 8/062 |
| | | | | 196/122 |
| 8,282,814 B2 * | 10/2012 | Peters | ............... | C10G 9/00 |
| | | | | 122/37 |
| 8,409,491 B1 | 4/2013 | Stackpoole et al. | | |
| 8,746,184 B2 * | 6/2014 | Home | ............... | F22B 15/00 |
| | | | | 122/235.11 |
| 9,833,762 B2 * | 12/2017 | He | ............... | C10G 9/20 |
| 2002/0110505 A1 * | 8/2002 | Wang | ............... | B01J 8/062 |
| | | | | 422/198 |
| 2008/0142411 A1 * | 6/2008 | Barendregt | ............ | C10G 9/20 |
| | | | | 208/132 |
| 2010/0081556 A1 | 4/2010 | Heng et al. | | |
| 2010/0243521 A1 * | 9/2010 | Peters | ............... | C10G 9/00 |
| | | | | 208/63 |
| 2013/0211169 A1 * | 8/2013 | Hershkowitz | ............ | C10G 9/18 |
| | | | | 585/535 |

* cited by examiner

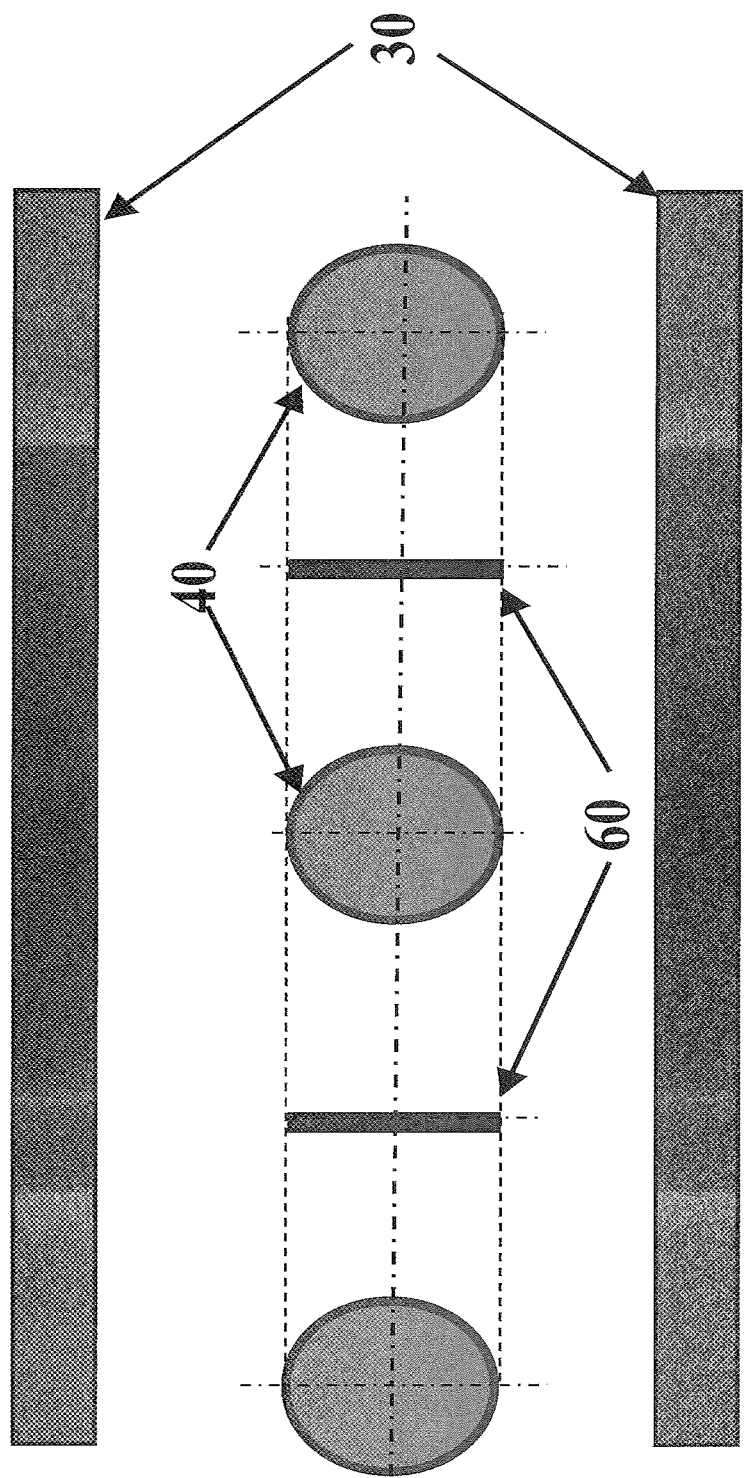

FURNACE TUBE RADIANTS

Disclosed herein are radiants for use with radiant section tubes in a fired heater, such as furnace tube coils for cracking paraffins such as $C_{2-4}$ paraffins. The radiant is a substantially linear structure of any cross section, including a ribbon, tube or rod with circular, oval, diamond, rectangular or polygon cross section of a solid (in the phase sense not necessarily a monolith) material having a coefficient of thermal expansion and creep resistance, comparable to the tube coil pass. At a temperature of not less than 1250° C., or for example, not less than 1275° C. the radiant should have a deformation of up to 100% of the coil pass deformation (e.g. elongation). The radiant absorbs radiant heat from the furnace walls, combustion gasses or both and re-radiates it towards the furnace tube coils. Since the radiant is not cooled by any process fluid, it will have temperature higher than the furnace tube coil which is cooled by the internally flowing process fluid. In petrochemical crackers having vertical or horizontal, tube coils, the coils are in a linear array, typically evenly spaced. Radiation from the combustion gases and furnace walls which passes between adjacent tube coils has a lower heating effect on the coils, because the coils are mutually and partially blocking their exposure to the radiating furnace walls and they compete with the adjacent coils for heat radiated by combustion gases passing between them. The radiants between tube coils will capture and redirect radiant energy onto the part of the coil surface which is perpendicular to the furnace walls, e.g., not directly exposed to the refractory walls, and which faces the adjacent coil in the radiant section of the furnace.

PRIOR ART

U.S. Pat. No. 2,733,692 issued Feb. 7, 1956 to Sherman assigned to Foster Wheeler teaches an "Oil Heater". The patent appears to relate to refining oil. At the top of the heater the pipes carrying oil pass through the top of the heater. There are passages 45 which are circular to and concentric to the tubes. Heat flows evenly around the entire circumference of the portion of each tube within the passages. Heat is radiated evenly from the wall of each passage to the entire circumference of the tube which it surrounds. (Col. 2, lines 65-72). The present invention does not contemplate concentric radiative alloy to more evenly distribute radiative heat to furnace tubes.

A 1965 article, entitled "ETHYLENE", which appeared in the November 13 issue of CHEMICAL WEEK, some basic discoveries were disclosed that revolutionized steam cracking furnace design. Researchers discovered that secondary reactions in the reacting gases are responsible for tube-wall coke. Shorter residence time with more heat favors primary olefin-forming reactions, not these secondary coke-causing reactions. Accordingly, higher heat flux and higher tube-wall temperatures emerged as the answer. A shorter residence time requires that heat must be transferred into the hydrocarbons faster. Two feasible ways suggested for expanding this heat input are by altering the mechanical design of the tubes so they have greater external surface per internal volume (i.e., a smaller diameter tube) and increasing the rate of heat flux through the tube walls (a higher temperature). The article did not suggest the use of radiants to increase the wall temperature of the tube nor to improve the uniformity of the circumferential temperature around the tube.

U.S. Pat. No. 3,671,198, issued Jun. 20, 1972 to Wallace, assigned to Pullman Incorporated, teaches cracking furnaces have smaller diameter vertical cracking tubes and a quenching system. The patent does not teach or suggest the use of a radiant.

U.S. Pat. No. 4,499,055 issued Feb. 12, 1985 to DiNicolantonio et al., assigned to Exxon Research and Engineering Company teaches a cracker having vertical furnace tubes in a row. The tubes have a bend so that on thermal expansion they stay in a plane. The patent does not teach or suggest a radiant to improve the efficiency of the radiant section of a cracker.

U.S. Pat. No. 8,746,184, issued Jun. 10, 2014 to Horne, is the only patent applicants are aware of that discloses the use of radiants. The patent teaches an improved steam boiler using radiants. The radiants are slotted metal sheets through which the combustion gases flow. The radiants are convection heated, not heated by radiation from the walls of the radiant section of the fired heater, and then radiate heat to the pipes to heat water to make steam. This is a change of state application not a change of composition application as in cracking tubes. The patent teaches away from a radiant having a continuous surface (e.g., no slots or holes) and being heated both by convection and by radiation. Further there is no suggestion that the radiants may have any use in the radiant section of a fired heater such as a cracking furnace.

This disclosure seeks to provide improved heat transfer efficiency in the radiant section of a chemicals cracker by the use of radiants between the coils. Improved efficiency will lead to a reduction in greenhouse gases from the fired heaters.

In some embodiments, the radiant section of a fired heater a radiant separate from the walls, having a melting point greater than 1250° C., and creep and deformation properties not less than 85% (or, for example, not less than 90%, or for example not less than 95%) of creep and deformation properties of the tubes in the radiant section of a fired heater, comprising a ceramic or alloy having a continuous surface.

In some embodiments, this disclosure provides a radiant in a substantially linear form with a continuous external surface smooth or modified with grooves or covered with micro-protuberances.

In some embodiments, the radiant may be in the form of a ellipsoid or polygon cross-section.

In some embodiments, the total length of a radiant can vary from 25 to 100% of the length of a tube coil pass in the radiant section of a fired furnace, a thickness sufficient to maintain integrity of the radiant from 0.5 to 1.5 of the thickness of the furnace coil wall, and width from ¼ to ¾ of the external diameter of the furnace tube.

In some embodiments, this disclosure provides a radiant having a total length from 50 to 90% of the length of a tube pass in the radiant section of a fired furnace and a diameter from ½ to ¾ of the external diameter of the furnace tube.

In some embodiments, this disclosure provides a radiant which is continuous (e.g. unit body).

In some embodiments, this disclosure provides a radiant comprising multiple segments joined together.

In some embodiments, at least a portion, for example, not less than 25% of the surface of the radiant contains an array of grooves having a depth from 1/16 to 1/8 of the thickness or width or diameter of the radiant.

In some embodiments, this disclosure provides a radiant which is vertical.

In some embodiments, this disclosure provides a radiant which is horizontal.

In some embodiments, this disclosure provides a radiant which is a metallic alloy and has a surface having a thickness from 10 to 5,000 microns comprising from 40 to 60 weight % of compounds of the formula $Mn_xCr_{3-x}O_4$ wherein x is from 0.5 to 2 and from 60 to 40 weight % of oxides of Mn and Si selected from MnO, $MnSiO_3$, $Mn_2SiO_4$ and mixtures thereof provided that the surface contains less than 5 weight % of $Cr_2O_3$.

In some embodiments, this disclosure provides a radiant comprising from about 55 to 65 weight % of Ni; from about 20 to 10 weight % of Cr; from about 20 to 10 weight % of Co; and from about 5 to 9 weight % of Fe and the balance one or more of the trace elements.

In some embodiments, this disclosure provides a radiant further comprising from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

In some embodiments, this disclosure provides a radiant comprising from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

In some embodiments, this disclosure provides a radiant further comprising from 0.2 up to 3 weight % of Mn; from 0.3 to 2 weight % of Si; less than 5 weight % of titanium, niobium and all other trace metals; and carbon in an amount of less than 0.75 weight %.

In some embodiments, this disclosure provides a radiant comprising from 20 to 38 weight % of chromium from 25 to 48, weight % of Ni.

In some embodiments, this disclosure provides a radiant further comprising from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

In some embodiments, this disclosure provides a radiant comprising an Mo—Si—B alloy.

In some embodiments, this disclosure provides a radiant comprising a ceramic selected from silicon dioxide, fused silicon dioxide, aluminum oxide, titanium dioxide, zirconium dioxide, thorium dioxide, lanthanum oxide, magnesium oxide, calcium oxide, barium oxide, tin oxide, cerium dioxide, zinc oxide, boron oxide, boron carbide, yttrium oxide, aluminum silicate, silicon nitride, silicon carbide and mixtures thereof.

In some embodiments, this disclosure provides a radiant section of a fired heater having tubes spaced in a pattern in which a coil view factor relative to the wall is altered by presence of an adjacent coil, wherein a radiant as above is positioned proximate at least a pair of adjacent tubes (to increase the radiant energy directed to the surface of said coils).

In some embodiments, this disclosure provides a radiant section as above wherein the radiant is vertical.

In some embodiments, this disclosure provides a radiant section wherein the radiant is suspended from an overhead mount.

In some embodiments, this disclosure provides a radiant section wherein the radiant is floor mounted.

In some embodiments, this disclosure provides a radiant section wherein the radiant is horizontal.

In some embodiments, this disclosure provides a method of thermally treating a fluid hydrocarbon comprising passing the hydrocarbon through a tube in the radiant section of a fired heater having radiants as above.

In some embodiments this disclosure the hydrocarbon is a $C_{2-4}$ paraffin which is passed through the tubes in the radiant section at a temperature from 800° C. to 1100° C. for a time from 0.001 to 0.01 seconds.

In some embodiments, the hydrocarbon is selected from heavy crude oil, heavy vacuum gas oil, resid, and naphtha.

In some embodiments, this disclosure provides a method to reduce the inhomogeneity of the external and internal circumferential temperature distribution of a tube in the radiant section of a fired heater by placing a radiant proximate the furnace tube In some embodiments, this disclosure provides a method to reduce the inhomogeneity of the external and internal circumferential heat flux of a tube in the radiant section of a fired heater by placing a radiant proximate said tube.

In some embodiments, this disclosure provides a cracking furnace comprising a radiant section having cracking coils spaced in a pattern in which a coil view factor relative to the wall is altered by presence of an adjacent coil, wherein a radiant according to claim 1, is position proximate at least a pair of adjacent coils to increase the radiant energy directed to the surface of said coils.

BRIEF DESCRIPTION OF THE DRAWINGS

FIG. 8 is a schematic of a furnace with ribbon radiants (60), which have a width equal to a diameter of a coil (40).

Figure 1:
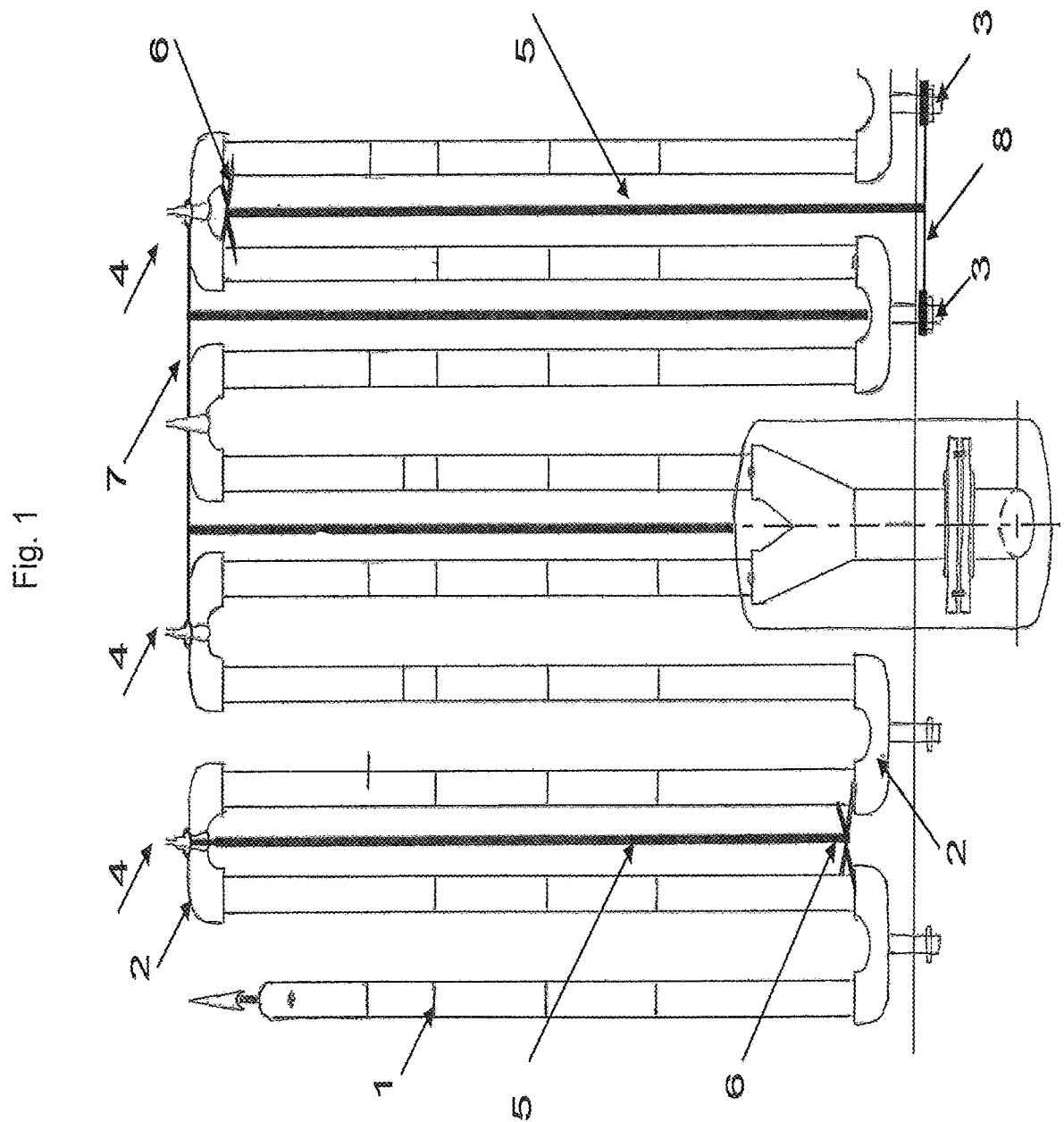
FIG. 1 is a schematic side view of coils and radiants in the radiant section of a furnace, to illustrate how vertical radiants may be installed.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the properties that the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

As used herein the term "substantially linear" or "substantially the same temperature" means the property does not deviate by more than 10% from (+1-) the comparator.

For chemical compositions the term "substantially" means the composition may further comprise up to 5 wt % of other unspecified ingredients.

As used in this specification a view factor (Fi,j) is defined as the ratio of radiation leaving a surface i that is intercepted by surface j. In a radiant heater, a coil "i" experiences radiation from the furnace walls "w", radiation from adjacent tube coils "j" (which are likely at the same temperature as the considered coil "i", and lower than the wall temperature) and radiation from combustion gasses "CG": $F_{i,w}$, $F_{i,coils\ j}$ and $F_{i,CG}$. This is a three by three matrix. As a practical matter the coils are at substantially the same temperature. When a radiant having a temperature greater than a coil is introduced a new view factor is introduced ($F_{i,(radiant)}$). This creates a four by four matrix for radiant heat transfer to a coil "i", the radiating bodies being the wall, the (adjacent) coils at a lower temperature, the radiants at higher temperature than the coil, and combustion gases at the highest temperature of all.

As used in this specification a "radiant" means a structure having a closed surface (no slots), smooth or extended with grooves or micro-protuberances, made of a material having a melting temperature above 1250° C., or for example greater than 1275° C. The radiant may be in the form of a ribbon, tube or rod with circular, oval, triangular, rectangular, diamond-shaped or polygon cross-section. It can comprise one segment of the required length or multiple segments which are joint together to form a radiant of the required length.

There are a number of chemical processes in which a hydrocarbon is subject to a heat treatment. In many of these treatments, the hydrocarbon is passed in liquid or gaseous form through a tube or furnace coil in the radiant section of fired heater (or radiant section tubes or coils of a fired heater). The hydrocarbon may be diluted by steam. Such treatments include cracking of paraffins such as naphtha and lower $C_{2-4}$ paraffins to form olefins. Other treatments include the processing of crude oil, including heavy crude oil, heavy vacuum gas, and the residual fraction from the vacuum separation of a thermally treated (heavy) crude oil and various forms of coking (delayed coking, FLEXICOKING™ and visbreaking). Radiants may be used in any process involving the radiant transfer of heat to a tube or coil containing a hydrocarbon to be processed. One particularly useful application of radiants in the radiant section of a fired heater is to crack paraffins to olefins such as cracking naphtha or lower $C_{2-4}$ paraffins to olefins.

Thermal treatment of hydrocarbons, as referenced above, is an energy intensive process. The hydrocarbon feed passes through a number of pipes or coils in the convection and radiant sections of fired heater (i.e., a furnace). In the radiant section of the furnace there are burners typically in the walls but they may also be floor mounted. The walls in the radiant section comprise refractory material such as brick. Fuel, such as, e.g., natural gas, is fed to the burners. The combustion gasses from the burners rise through the radiant section. The walls of the radiant section are heated and generate radiation to heat the coils in the radiant section. Additionally, as the combustion gasses rise through the radiant section, they provide radiation and convection heating to the coils heating their contents the required temperature such as a cracking temperature. Cracking temperatures may range from at least 800° C. to about 1100° C., or for example at least about 900° C. to about 1100° C., or for example from 950° C. to 1050° C. Other thermal treatments may take place over a broader temperature range such as from 500° C. to 1200° C., or for example from 600° C. to 1150° C. The time for the thermal treatment may range from mili-seconds (0.001 seconds) to 1 second, or for example from 0.001 to 0.1 seconds, in some embodiments from 0.001 to 0.01 seconds. Generally, the thermal treatments may be carried out at low pressures, in some cases near atmospheric pressure (e.g., from 80 kPa to about 120 kPa). The product stream is then separated in a conventional manner.

In some embodiments, the combustion gasses exiting from the radiant section pass through the convection section of the furnace passing over tubes or coils to pre-heat their content to near cracking temperature. The gasses then exit the convection section, flow through the stack and exit the furnace.

In the radiant section of the furnace, the coils may be vertical or horizontal. In some embodiments, there are two or more arrays of furnace coils spaced on either side of the furnace proximate the wall. The coils typically comprise straight passes connected by "U" bends to provide a continuous flow path for the feed. The straight passes are spaced apart, for example from about ½ to 2, or, for example, from about ½ to 1½ times the diameter of the pass. The radiation from the furnace walls impinges on the side of the coil exposed/adjacent to the wall. Between the coil passes there is nothing to "catch" the radiation from the wall and to redirect it to the coils. There is a shadow area cast by one coil on an adjacent coil where radiation from the walls is partially blocked. As a result, there is less heat radiated on the side of coil surface which faces the other coil and, as a result, the coils do not have a uniform circumferential surface temperature.

In some embodiments, a radiant may be placed approximately equidistant between the straight passes of the coils. The radiant is heated by the radiation from the walls of the furnace radiant section and also, it is heated by the combustion gasses. The radiant then radiates energy to the sides of the furnace tubes facing it. This results in a more uniform circumferential temperature distribution in the coil and an increase in the total heat transferred to the coil. The radiant should have a continuous external surface.

Optionally, at least a portion, for example, 25%, or for example greater than 50% of the surface of the radiant may have a pattern of groves or protuberances. The groves may have a depth from 1/16 to 1/8 of the thickness or diameter of the radiant. The grooves may be in the form of an outwardly open V, a truncated outwardly open V, an outwardly open U, an outwardly open parallel sided channel. The protuberances may be evenly or unevenly spaced along the radiant. The proximity of the protuberances to each other may change along the length of the radiant. The protuberances may comprise from 5% up to 35% of the weight of the radiant. The protuberance may have geometrical shape, having a relatively large external surface that contains a relatively small volume, such as for example tetrahedrons, pyramids, cubes, cones, a section through a sphere (e.g., hemispherical or less), a section through an ellipsoid, a section through a deformed ellipsoid (e.g., a tear drop) etc. Some useful shapes for a protuberance include:

a tetrahedron (pyramid with a triangular base and 3 faces that are equilateral triangles);

a Johnson square pyramid (pyramid with a square base and sides which are equilateral triangles);

a pyramid with 4 isosceles triangle sides;

a pyramid with isosceles triangle sides (e.g., if it is a four faced pyramid the base may not be a square it could be a rectangle or a parallelogram);

a section of a sphere (e.g., a hemi sphere or less);

a section of an ellipsoid (e.g., a section through the shape or volume formed when an ellipse is rotated through its major or minor axis); and.

a section of a tear drop (e.g., a section through the shape or volume formed when a non uniformly deformed ellipsoid is rotated along the axis of deformation);

a section of a parabola (e.g., section though the shape or volume formed when a parabola is rotated about its major axis—a deformed hemi—(or less) sphere).

The radiant may be hollow or solid provided it has sufficient mechanical stability to withstand the environment. The radiants will be subject to thermal stress and will to some extent undergo deformation (length change). It should be noted that some shapes such as a ribbon or bar when under non uniform thermal stress may be more prone to warping or bending.

The radiant may have a dimensions from about at least 75%, in some instances at least 80%, or for example at least 90%, or for example 100% of the length of the tube pass within the radiant section. For a bar or a ribbon the radiant may have a thickness from 0.5 to 1.5 of the thickness of the tube wall and a width from 3/8 to 7/8, or, for example, from 1/2 to 3/4 of the external diameter of the furnace tube. For tubular radiants, the diameter may be from 2/8 to 7/8, or for example from 1/2 to 3/4 of the external diameter of the furnace tube. The width (or diameter for a circular radiant) is based on the coil or pipe exposure to the refractory and other coils. The radiant should be wide enough to shield the tube or coil from exchanging heat with adjacent coils, but small enough not to reduce the coil or tube view factor with respect to the furnace wall refractory. One advantage of a tubular radiant is that it may be less prone to bending or warping in use.

The radiant may be made of any material capable of withstanding the ambient conditions in the radiant section of the cracking furnace. The radiant may be metallic or ceramic. The radiant should have an emissivity greater than 0.5, or for example from 0.6 to 0.95, or, for example, from 0.6 to 0.85, or, for example, from 0.6 to 0.8, or, for example, from 0.6 to 0.7.

The radiant may be stainless steel which may be selected from wrought stainless, austentic stainless steel and HP, HT, HU, HW and HX stainless steel, heat resistant steel, and nickel or molybdenum based alloys (thermalloy). The radiant may be a high strength low alloy steel (HSLA); high strength structural steel or ultra-high strength steel. The classification and composition of such steels are known to those skilled in the art.

In some embodiments, the stainless steel, for example heat resistant stainless steel, comprises from 13 to 50, or for example 20 to 50, or for example from 20 to 38 weight % of chromium. The stainless steel may further comprise from 20 to 50, or for example from 25 to 50, or for example from 25 to 48, or for example from about 30 to 45 weight % of Ni. The balance of the stainless steel may be substantially iron.

In some embodiments, nickel and/or cobalt based extreme austentic high temperature alloys (HTAs) are useful. In some embodiments, the alloys comprise a major amount of nickel or cobalt. In some embodiments, the high temperature nickel based alloys comprise from about 50 to 70, or for example from about 55 to 65 weight % of Ni; from about 20 to 10 weight % of Cr; from about 20 to 10 weight % of Co; and from about 5 to 9 weight % of Fe and the balance one or more of the trace elements noted below to bring the composition up to 100 weight %. In some embodiments, the high temperature cobalt based alloys comprise from 40 to 65 weight % of Co; from 15 to 20 weight % of Cr; from 20 to 13 weight % of Ni; less than 4 weight % of Fe and the balance one or more trace elements as set out below and up to 20 weight % of W. The sum of the components adding up to 100 weight %.

In some embodiments, the steel may further comprise a number of trace elements including at least 0.2 weight %, up to 3 weight %, or for example 1.0 weight %, up to 2.5 weight %, or for example not more than 2 weight % of manganese; from 0.3 to 2, or for example 0.8 to 1.6, or for example less than 1.9 weight % of Si; less than 3, or for example less than 2 weight % of titanium, niobium (or for example less than 2.0, or for example less than 1.5 weight % of niobium) and all other trace metals; and carbon in an amount of less than 2.0 weight %. The trace elements are present in amounts so that the composition of the steel totals 100 weight %.

Newer alloys may be used which contain up to about 12% Al, for example less than 7 weight %, or for example about 2.5 to 3 weight % aluminum as disclosed for example in U.S. Pat. No. 7,278,828, issued Oct. 9, 2007 to Steplewski et al., assigned to General Electric Company. In some embodiments, in the high cobalt and high nickel steels the aluminum may be present in an amount up to 3 weight %, or for example between 2.5 and 3 weight %. In the high chrome high nickel alloys (e.g. 13 to 50, or for example 20 to 50, weight % of Cr and from 20 to 50 weight % of Ni) the aluminum content may range up to 10, or for example less than about 7, or for example from about 2 to 7 weight %.

For high chrome steels, the radiant may have a surface having a thickness from 10 to 5,000 microns comprising from 40 to 60 weight % of compounds of the formula $Mn_xCr_{3-x}O_4$ wherein x is from 0.5 to 2 and from 60 to 40 weight % of oxides of Mn and Si selected from MnO, $MnSiO_3$, $Mn_2SiO_4$ and mixtures thereof provided that the surface contains less than 5 weight % of $Cr_2O_3$.

The radiant may be an alloy of molybdenum and silica optionally containing boron (e.g., $MoSi_2$ or $Mo_5SiB_2$).

Such surfaces may be produced using a treatment disclosed in U.S. Pat. No. 6,436,202 issued Aug. 20, 2002 to Benum et al., assigned to NOVA Chemicals (International) S.A. the text of which is incorporated herein by reference. The radiant may be a ceramic. Some ceramics are capable of withstanding the high temperatures in the radiant section of the furnace. However, ceramics tend to be brittle. The ductility of the matrix may be improved by incorporating metallic or ceramic platelets, whiskers having a high aspect ratio or particles into the ceramic body (ceramic matrix composite—CMC). In some embodiments, the body of the ceramic may comprise an oxide, carbide, nitride or borate including silicon dioxide, fused silicon dioxide, aluminum oxide, titanium dioxide, zirconium dioxide, thorium dioxide, lanthanum oxide, magnesium oxide, calcium oxide, barium oxide, tin oxide, cerium dioxide, zinc oxide, boron oxide, boron carbide, yttrium oxide, aluminum silicate, silicon nitride, silicon carbide hafnium boride, zirconium boride, tantalum boride, tantalum carbide, titanium boride, tantalum carbide, hafnium carbide, niobium carbide, titanium carbide, zirconium carbide, hafnium nitride, tantalum nitride and zirconium nitride, and mixtures thereof.

The fibers or whiskers, platelets, or particles may be selected from silicon carbide, silicon nitride, boron carbide and boron nitride. In some instances metals having a high melting point may be used. The reinforcing material may be coated with a very thin coating (1-5 microns) of a substance to permit some "slippage" of the reinforcement in the ceramic to reduce crack propagation (e.g. carbon).

U.S. Patent Application Publication No. 2010/0081556, published Apr. 1, 2010 to Heng at al., and U.S. Pat. No. 8,409,491 issued Apr. 2, 2013 to Stackpoole et al., assigned to The United States of America as represented by the Administration of the National Aeronautics & Space Administration (NASA), the contents of which are herein incorporated by reference are useful in describing high temperature ceramics having good tensile properties.

In some embodiments, the radiant, whether metal (e.g., steel or thermalloy) or ceramic, has a thermal emissivity between 0.6 and 0.8, for example.

The radiant may be vertically spaced approximately (e.g., within about 20%, or for example about 10% or less from the midpoint) equidistant between adjacent furnace tubes. FIG. 1 schematically shows how the radiant may be fixed in the radiant section of a furnace having vertical tubes or coils. In FIG. 1 the furnace tubes or coils 1, which may be formed from a number of sections form a series of straight passes joined at the top and bottom by "U" bends 2. The coil may be anchored in the radiant section of the furnace by supports at the "U" bends at the bottom of the furnace or supports 3 or hangers 4 at the top of the furnace. A radiant 5 may be hung directly from the support (hanger) 4 at the top of the "U" bend. Spacers—separators 6 may be used to keep the radiant in position and reduce thermal bending or flexing. A stringer 7 may be joined to two or more hangers 4, and one or more radiants 5 may be hung from the stringer 7. A stringer 8 may also run between one or more bottom guides 3[[s]] and a radiant 5 may be supported from the bottom stringer. The bottom supported radiant 5 may also have spacers 6 to help position the radiant 5 and reduce thermal bending and flexing.

The radiant may be suspended from upper part of the radiant section such as the supports for the roof or the under surface of the roof per se. Suitable mechanical couplings and suspending devices are known to one of ordinary skill in the art. A vertical radiant could be supported directly or indirectly (stringers or guides) from the floor of the radiant section and the hangers for the coils. In some embodiments, a vertical radiant could be supported from both the floor and the hangers for the coils in the upper part of the radiant section of the furnace.

Horizontal radiants could be supported from the upper section or the floor or both of the radiant section of the furnace. In an alternative embodiment, the horizontal radiants could be supported from the end walls of the radiant sections or stringers running from the upper portions (ceiling) to the floor of the radiant section. Suitable mechanical couplings and suspending devices are known to one of ordinary skill in the art.

The present invention will now be illustrated by the following non limiting examples.

Reference case: Model of the Radiant Section of the Cracking Furnace.

A computer model of the heat transfer in the radiant section of the NOVA Chemicals second ethane cracker at Joffre was developed, using ANSYS Mechanical software. The model was run to simulate the process in the cracking furnace in which there were no radiants between the vertical coils in the furnace radiant section. The coils were heated by radiation from the furnace walls and by forced convection by combustion gases produced by the furnace wall burners and flowing along the coils. Heat acquired by the coil external surface was transferred by conduction through the coil wall and by internal forced convection to the stream of process gas (feed) flowing inside the coil. The model predicted the temperature of the external and internal surfaces of the coils, as well as temperature of furnace refractory. The input data used for the simulation, such as specific geometry and dimensions of the furnace and of the coils, feed flow rate, fuel gas composition and flow rate into the burners, feed and product compositions and temperatures at the inlet and outlet of the furnace radiant section, etc., were the actual operating data measured in the cracking furnace in Joffre. There was good qualitative agreement between the calculated and the measured coil surface temperatures, and the model validly represented the operation of the furnace radiant section.

In the figures, like parts are designated by like reference numbers.

Figure 2:
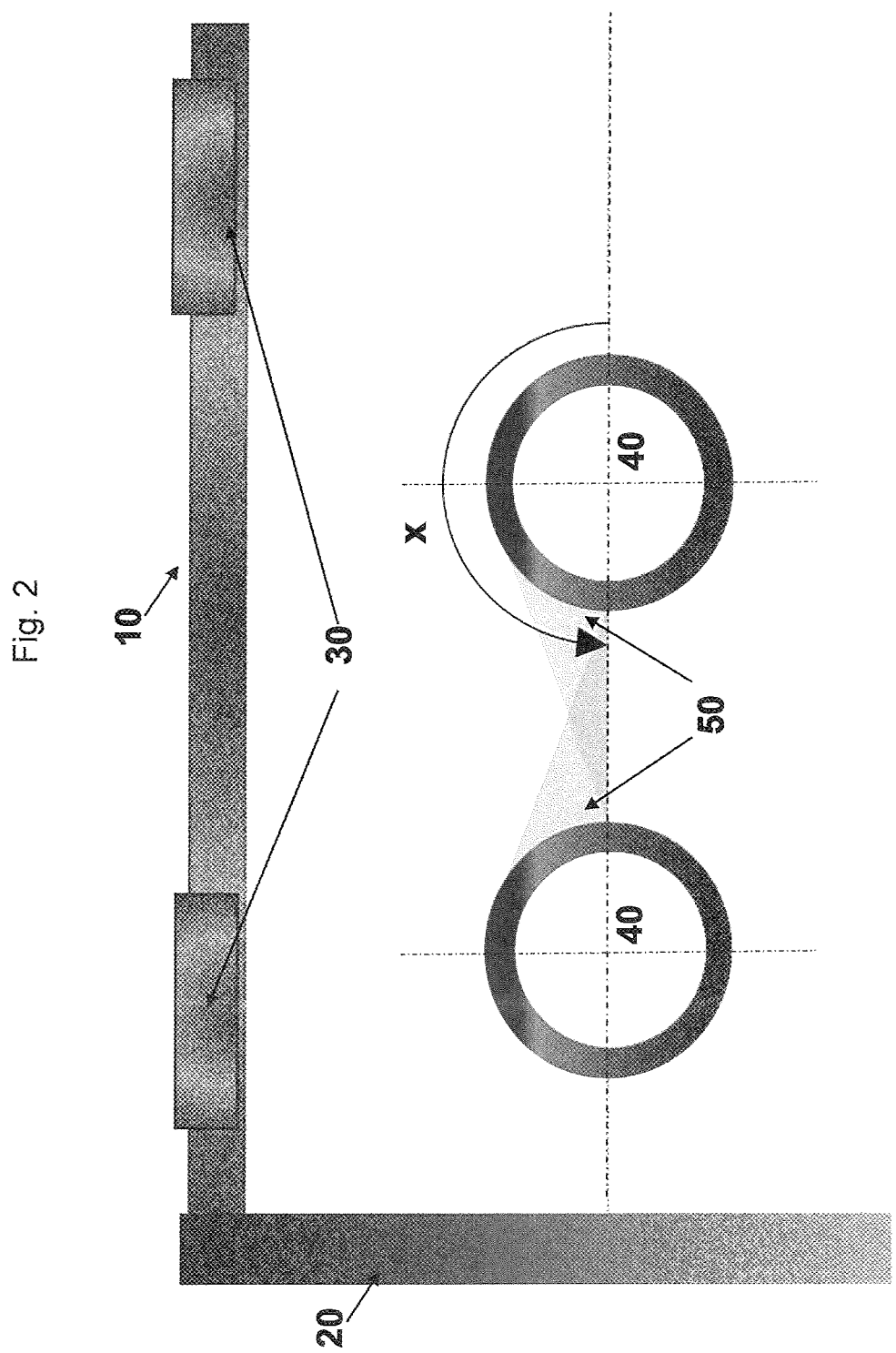
FIG. 2 is a schematic sectional view of a corner of a cracking furnace having vertical coils.
Figure 3:
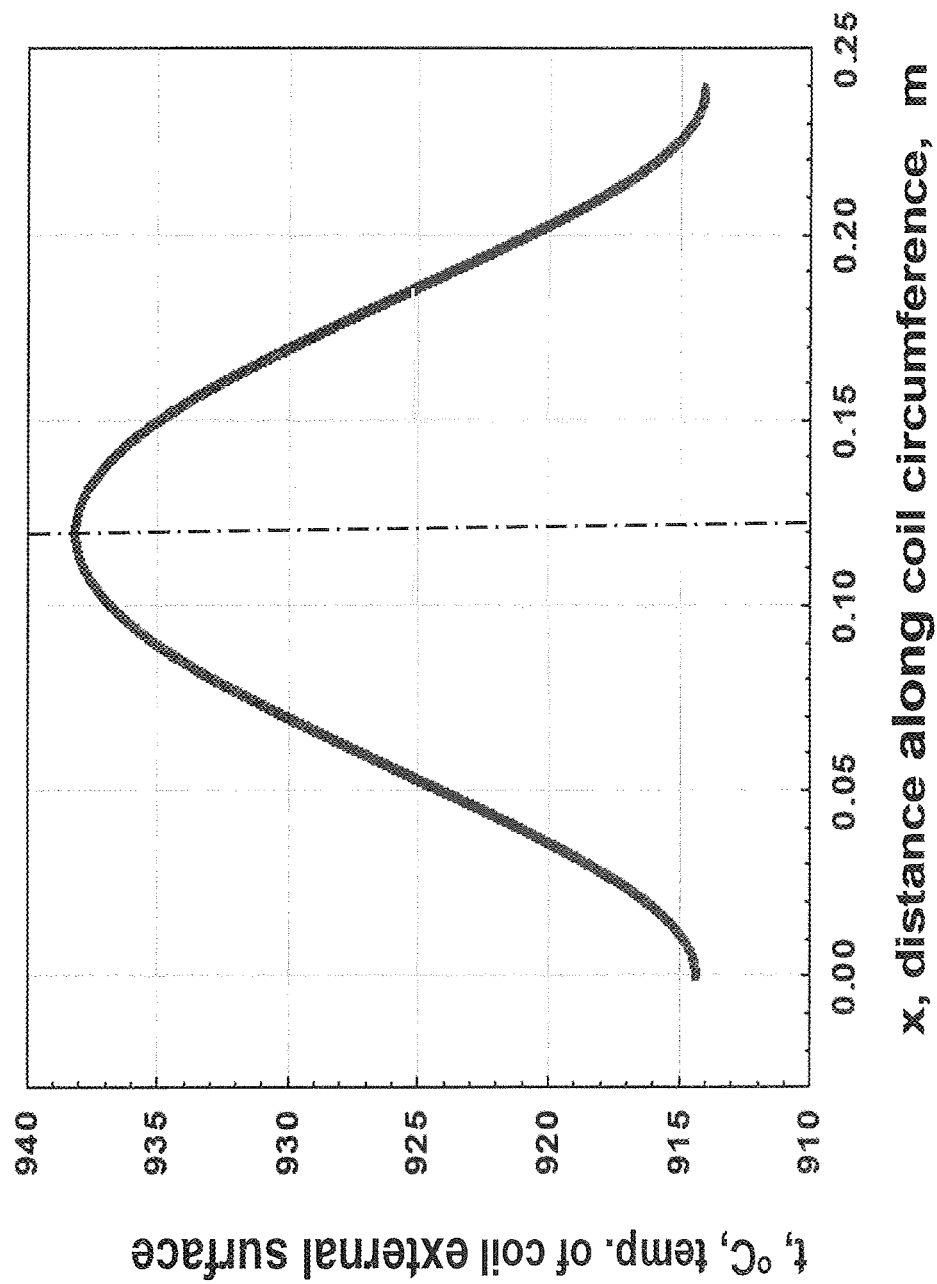
FIG. 3 is a plot of the circumferential temperature of the right coil in FIG. 2.

FIG. 2 shows a schematic cross section of the furnace tube coils in a furnace. In FIG. 2, the furnace is generally indicated as 20, the furnace walls 10 radiate heat generated by the burners 30 onto the coils 40. The cooler coil surface area due to a reduced view factor due to adjacent coils is referenced by 50. FIG. 3 shows the temperature distribution around the half of the coil circumference (180°), with the maximum temperature corresponding to the coil surface exposed directly to the furnace walls, and the lowest coil temperature on the coil side facing the adjacent coils.

Figure 4:
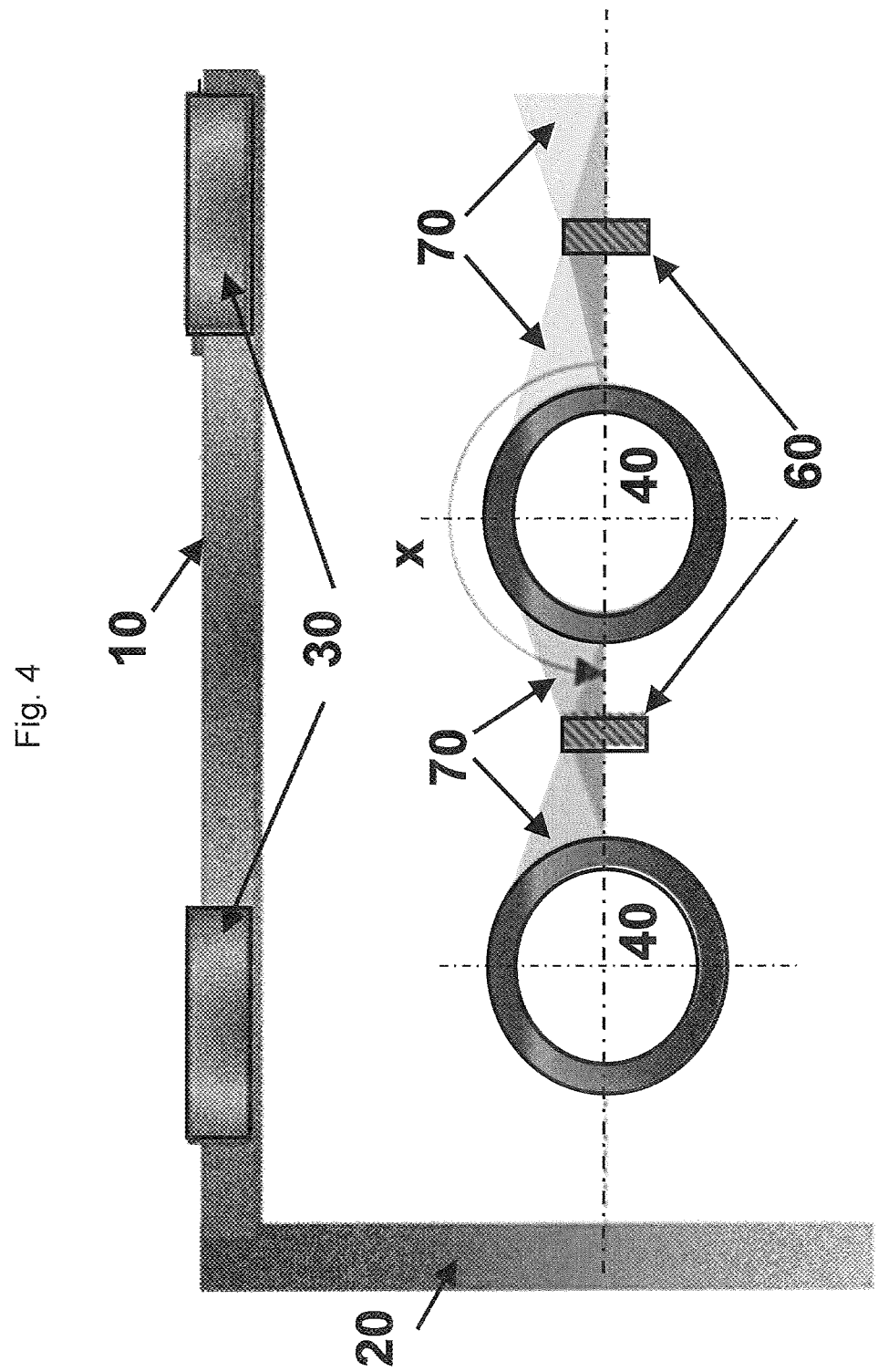
FIG. 4 is schematic sectional view of a corner of a cracking furnace having vertical coils and vertical radiants between the coils.
Figure 6:
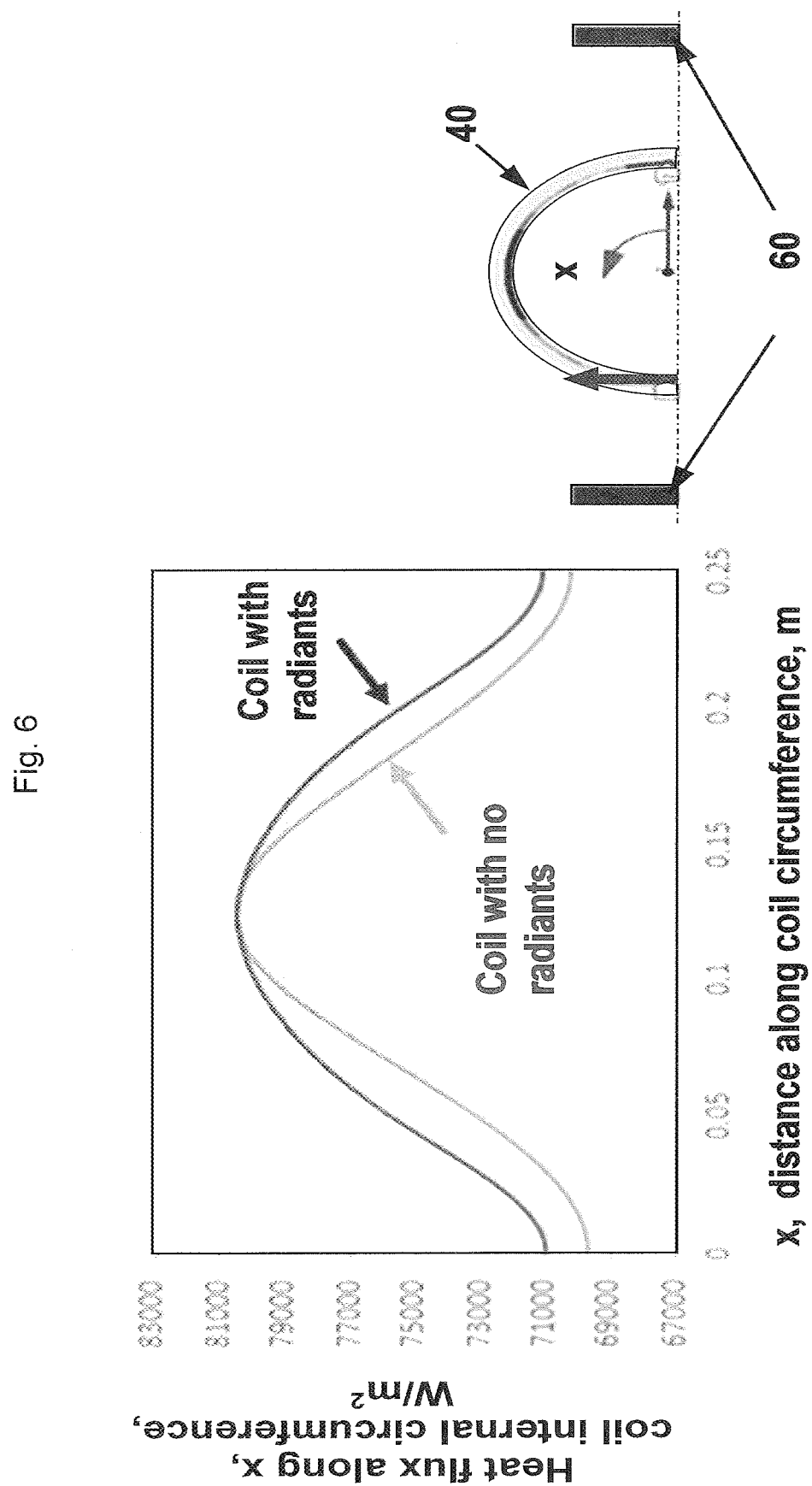
FIG. 6 is a plot of the heat fluxes at the inner surface of the right coil from FIG. 4 and of the right coil from FIG. 2.

FIG. 6 is a plot of the heat flux around the internal surface of a coil 40 when radiants are absent (i.e., FIG. 2) and when radiants 60 are present (i.e., FIG. 4).

EXAMPLE 1

The simulation was re-run except that a radiant was placed at the center point between the tubes, as shown in FIG. 4 is a schematic view of a furnace having radiants 60 placed between the coils 40. In FIG. 4 the dark area 70 is the heat radiated by the radiants 60 to the surface of coil 40.

Figure 5:
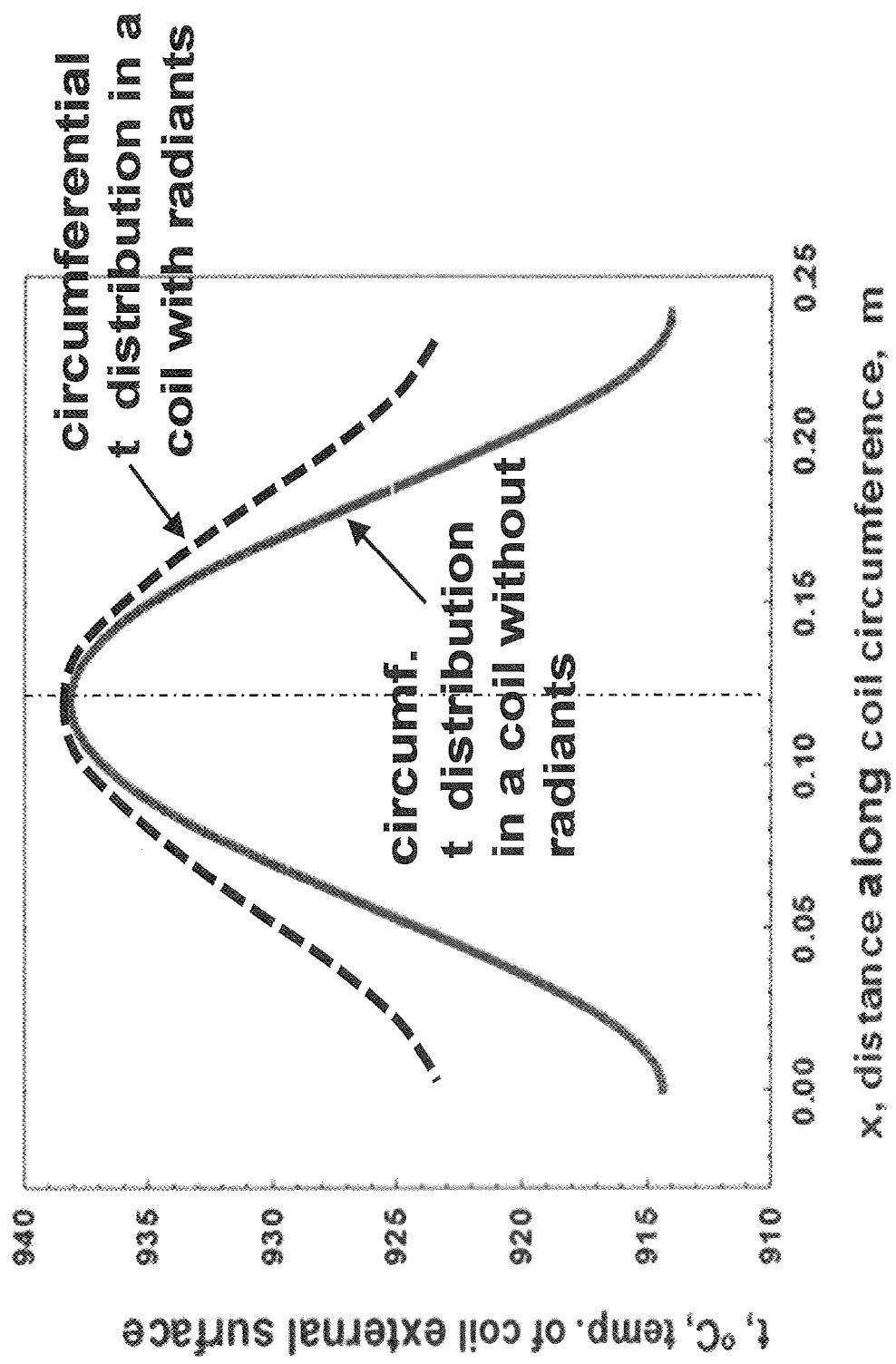
FIG. 5 is a plot of the circumferential temperature distributions of the right coil from FIG. 4 and of the right coil from FIG. 2.

The radiant was a ribbon having the same radiative emissivity as the coils. The radiant had the same length as the coil pass. Apart from the radiants, the conditions of the simulation were kept constant. FIG. 5 plots of the circumferential temperature distribution in the coil of the reference case (no radiants, as in FIG. 2) and in the case where radiants are present (i.e., FIG. 4). The plot shows that there is a more uniform circumferential temperature on the coil surface in the case where radiants are present.

The resulting heat flux absorbed by coils with and without radiants is shown in FIG. 6. FIG. 6 shows that the heat flux arriving to the internal surface of a coil 40 when radiants are absent (i.e., FIG. 2) is lower than when the radiants 60 are present (i.e. FIG. 4).

Figure 7A:
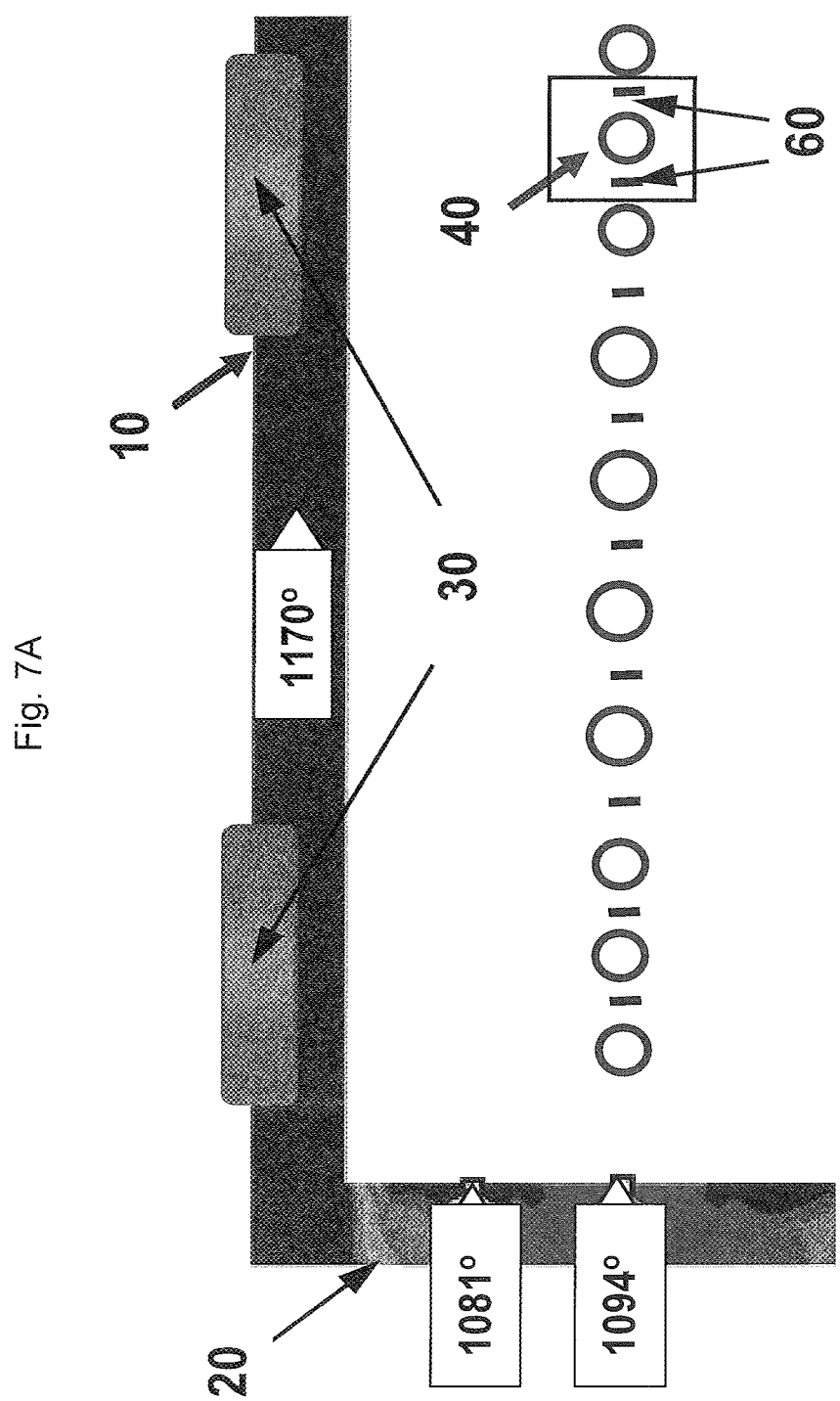
FIG. 7A is as schematic diagram of a wall fired furnace with the calculated temperature values of the furnace walls and FIG. 7B is the coil with two adjacent radiants, indicated on FIG. 7A, with the calculated temperature values of the inserts and of the coil external wall.
Figure 7B:
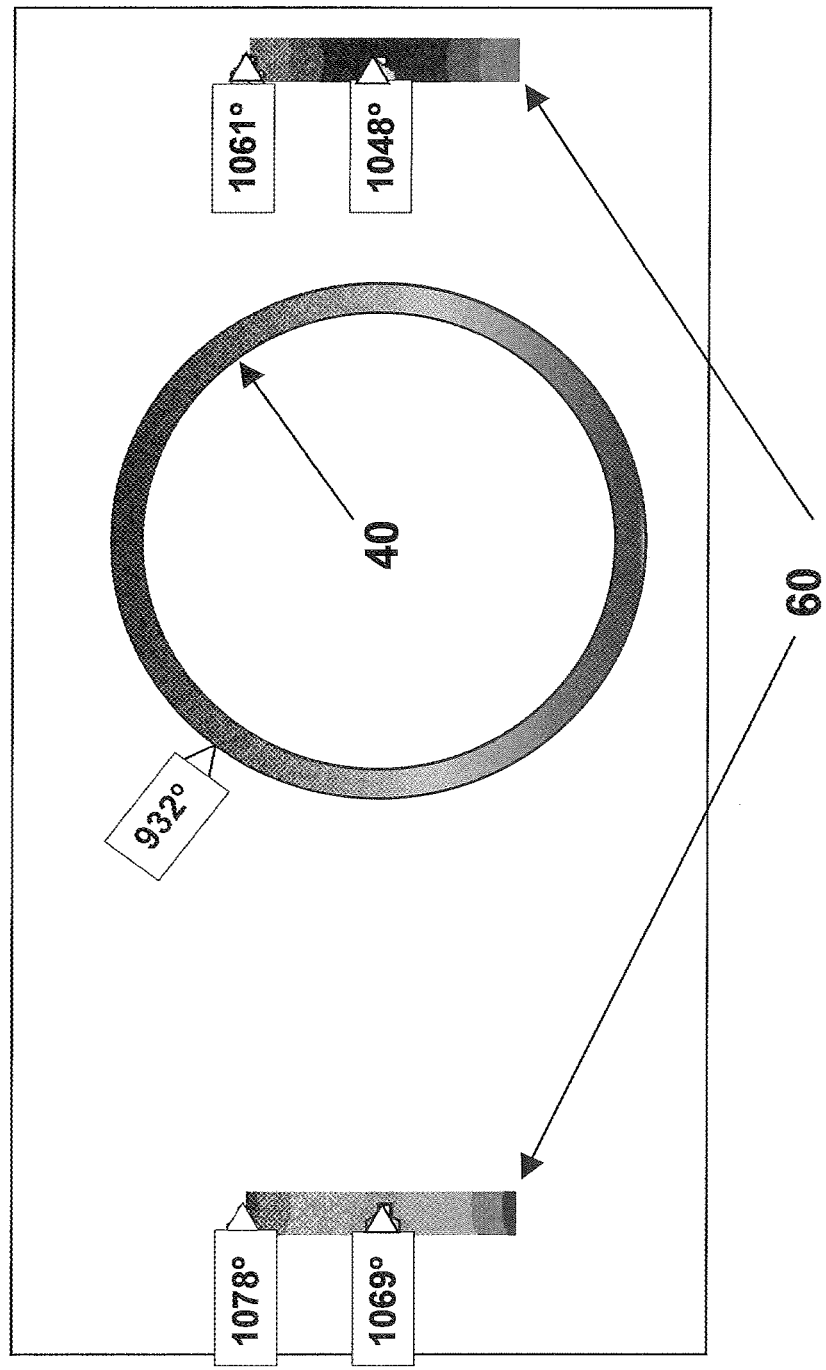

As there is no fluid flowing through the radiant it reaches a higher temperature than the tube or coil and radiates heat towards the adjacent coils. The calculated temperature distribution in the furnace walls 10, coils 40 and radiants 60 are shown for a side wall fired furnace in FIGS. 7A and 7B. The figures show that the radiants 60 are at higher temperature than the coils 40 and that radiant 60 temperature is very close to temperature of furnace end walls with no burners. This shows that for bottom fired heaters or furnaces, when burners are not installed on the walls, temperatures of all furnace walls should be similar, and the temperature of the radiants should be close to the temperature of the walls.

EXAMPLE 2

The simulation was re-run except there were no radiants but the furnace coils had two longitudinal fins parallel to the side walls of the radiant section. The fins were made of the same material as coils, thus, had the same properties such as emissivity and conductivity as the coil (and the radiant). The radiant heat transmission to the finned coils was slightly higher (by 1.0%-2.0%) than for the case when coils were bare but separated by radiants. However, contrary to the radiants, the finned coils are much more expensive, challenging to manufacture and are subjected to a creep strain.

EXAMPLE 3

Figure 9:
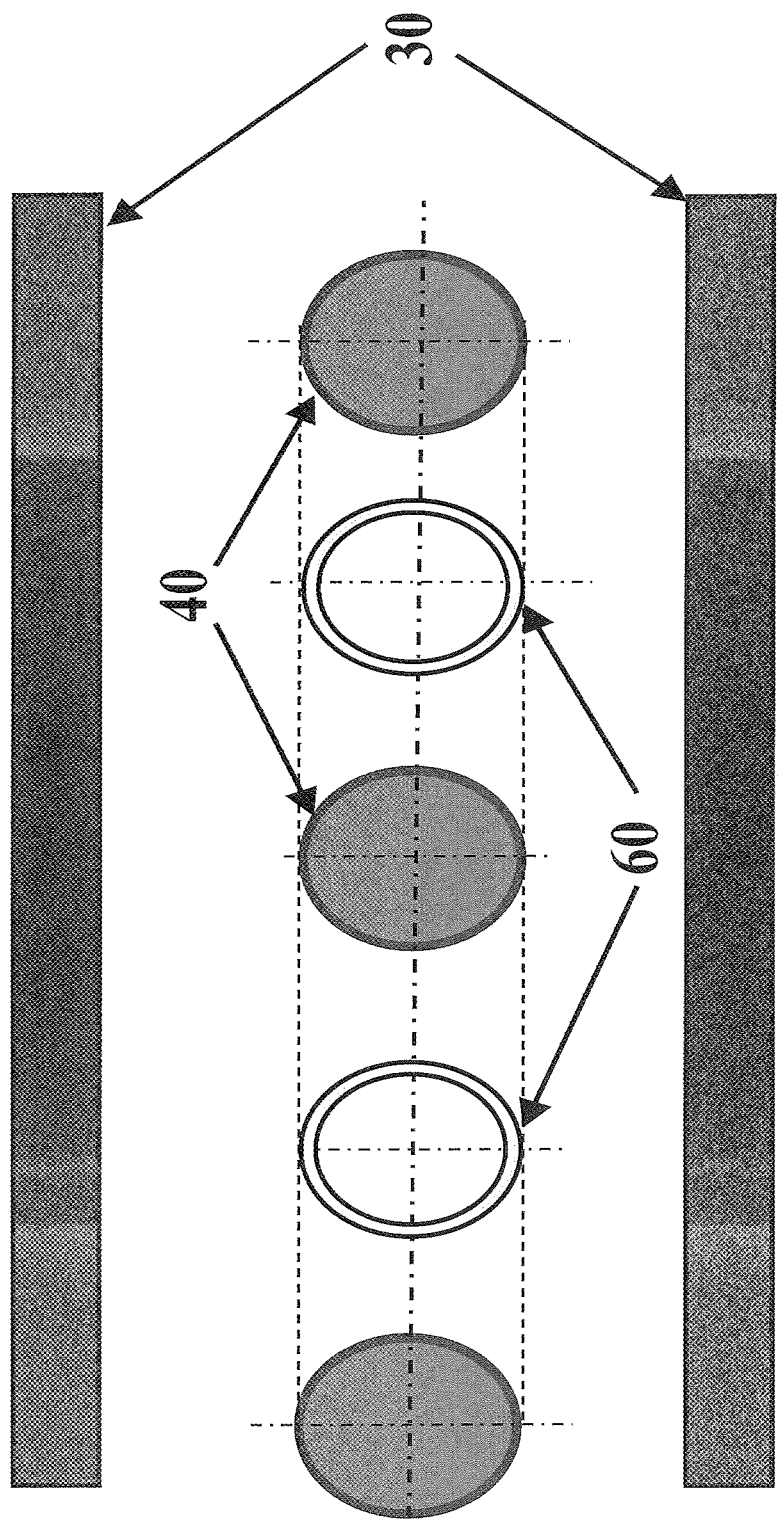
FIG. 9 is a schematic of a furnace with cylindrical radiants (60) which have diameters equal to a diameter of a coil (40).

The analytical model of radiation in the furnace, comprising coils and radiants was developed. Two radiant geometries were considered: a ribbon and a cylinder. The temperature of the furnace walls and of the coils were assumed as in the ANSYS model (i.e., Twall=1170° C., Tcoil=940° C.) and so were the respective emissivities (i.e., coil emissivity=0.8, radiant emissivity=0.8, furnace wall emissivity=0.6). The view factors were calculated rigorously for the coils separated with the ribbon and cylindrical radiants. To simplify the complexity of the radiation pattern in a furnace with radiants, it has been assumed that the width of the ribbon radiants (60) was equal to the diameter of the coils (40), as shown in FIG. 8 and so was the diameter of cylindrical radiants (60), as shown in FIG. 9.

Heat received by a coil Q* separated by both types of radiants was calculated as a function of radiant temperature and was compared with heat Q received by a coil with no radiants. The results, shown in FIG. 10, indicate that the benefit of the cylindrical radiant was larger than the benefit of the ribbon radiant. The calculation demonstrates the trends only, not a practical applications, as both radiants are assumed to be of a size of coil diameter.

Figure 10:
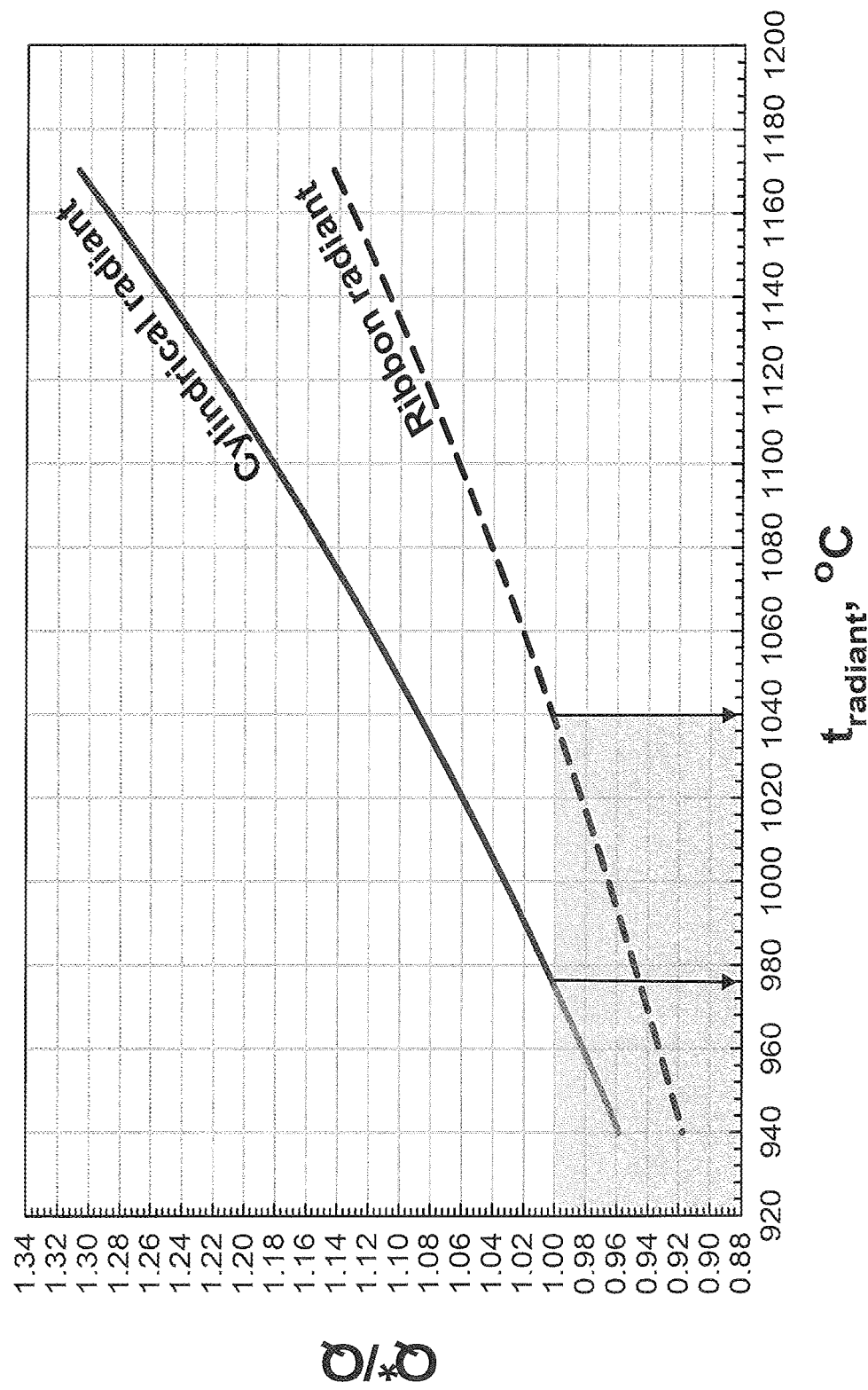
FIG. 10 is a plot showing an increase in heat Q* absorbed by a coil with adjacent cylindrical and ribbon radiants, respectively, as compared to heat Q absorbed by a coil with no radiants.

The shaded area in FIG. 10 shows that a ribbon radiant to be efficient has to be heated to temperature >1040° C., (i.e., Q*/Q>1 for t>1040° C.), while a cylindrical radiant is already efficient when its temperature exceeds 975° C. (i.e., Q*/Q>1 for t>975° C.).

An additional benefit of a cylindrical radiant can be a lower thermal stress on the cylindrical radiant and less tendency of the radiant to warp or bend

What is claimed is:

1. In the radiant section of a fired heater chemical cracker at least two radiants separate from at least one wall, and intermediate to vertical tubes which carry hydrocarbons through the radiant section of the chemical cracker, said radiant having a melting point greater than 1250° C., and creep and deformation properties not less than 85% of creep and deformation properties of the tubes in the radiant section of the fired heater chemical cracker, comprising a ceramic or alloy having a closed continuous surface.

2. The radiant according to claim 1, in the form of a substantially linear element with cross section of ellipsoid or polygon.

3. The radiant according to claim 2, having an external surface which is smooth or modified with grooves or microprotuberances.

4. The radiant according to claim 2, comprising a continuous element.

5. The radiant according to claim 4, having a length from 25 to 100% of the length of a tube pass in the radiant section of a fired heater chemical cracker.

6. The radiant according to claim 5, having a length from 50 to 90% of the length of a tube pass in the radiant section of a fired heater chemical cracker a width from ¼ to ¾ of the external diameter of the furnace tube.

7. The radiant according to claim 6, which is vertical.

8. The radiant according to claim 4 which is an alloy and has a surface having a thickness from 10 to 5,000 microns comprising from 40 to 60 weight % of compounds of the formula $Mn_xCr_{3-x}O_4$ wherein x is from 0.5 to 2 and from 60 to 40 weight % of oxides of Mn and Si selected from MnO, $MnSiO_3$, $Mn_2SiO_4$ and mixtures thereof provided that the surface contains less than 5 weight % of $Cr_2O_3$.

9. The radiant according to claim 4, comprising from about 55 to 65 weight % of Ni; from about 20 to 10 weight % of Cr; from about 20 to 10 weight % of Co; and from about 5 to 9 weight % of Fe and the balance one or more of the trace elements.

10. The radiant according to claim 9, further comprising from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

11. The radiant according to claim 4, comprising from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

12. The radiant according to claim 11, further comprising from 0.2 up to 3 weight % of Mn; from 0.3 to 2 weight % of Si; less than 5 weight % of titanium, niobium and all other trace metals; and carbon in an amount of less than 0.75 weight %.

13. The radiant according to claim 4, comprising from 20 to 38 weight % of chromium from 25 to 48, weight % of Ni.

14. The radiant according to claim 13, further comprising from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

15. The radiant according to claim 4, comprising a ceramic selected from silicon dioxide, fused silicon dioxide, aluminum oxide, titanium dioxide, zirconium dioxide, thorium dioxide, lanthanum oxide, magnesium oxide, calcium oxide, barium oxide, tin oxide, cerium dioxide, zinc oxide, boron oxide, boron carbide, yttrium oxide, aluminum silicate, silicon nitride, silicon carbide and mixtures thereof.

16. The radiant according to claim 2, comprising multiple joined segments.

17. The radiant according to claim 16, having a length from 25 to 100% of the length of a tube pass in the radiant section of a fired heater chemical cracker.

18. The radiant according to claim 17, having a length from 50 to 90% of the length of a tube pass in the radiant section of a fired heater chemical cracker a width from ¼ to ¾ of the external diameter of the furnace tube.

19. The radiant according to claim 16, which is an alloy and has a surface having a thickness from 10 to 5,000 microns comprising from 40 to 60 weight % of compounds of the formula $Mn_xCr_{3-x}O_4$ wherein x is from 0.5 to 2 and from 60 to 40 weight % of oxides of Mn and Si selected from $MnO$, $MnSiO_3$, $Mn_2SiO_4$ and mixtures thereof provided that the surface contains less than 5 weight % of $Cr_2O_3$.

20. The radiant according to claim 16, comprising from about 55 to 65 weight % of Ni; from about 20 to 10 weight % of Cr; from about 20 to 10 weight % of Co; and from about 5 to 9 weight % of Fe and the balance one or more of the trace elements.

21. The radiant according to claim 20, further comprising from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

22. The radiant according to claim 16, comprising from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

23. The radiant according to claim 22, further comprising from 0.2 up to 3 weight % of Mn; from 0.3 to 2 weight % of Si; less than 5 weight % of titanium, niobium and all other trace metals; and carbon in an amount of less than 0.75 weight %.

24. The radiant according to claim 16, comprising from 20 to 38 weight % of chromium from 25 to 48, weight % of Ni.

25. The radiant according to claim 24, further comprising from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

26. The radiant according to claim 16, comprising an alloy of molybdenum and silica optionally containing boron.

27. The radiant according to claim 16, comprising a ceramic selected from silicon dioxide, fused silicon dioxide, aluminum oxide, titanium dioxide, zirconium dioxide, thorium dioxide, lanthanum oxide, magnesium oxide, calcium oxide, barium oxide, tin oxide, cerium dioxide, zinc oxide, boron oxide, boron carbide, yttrium oxide, aluminum silicate, silicon nitride, silicon carbide and mixtures thereof.

28. A radiant section of a fired heater chemical cracker having tubes spaced in a pattern where a tube view factor is altered by presence of an adjacent tube, wherein at least one radiant according to claim 1 is positioned proximate at least a pair of tubes to increase the radiant energy directed to the surface of said tubes.

29. The radiant section of a fired heater chemical cracker according to claim 28, wherein the radiant is vertical.

30. The radiant section of a fired heater chemical cracker according to claim 29, wherein the radiant is suspended from an overhead mount.

31. The radiant section of a fired heater chemical cracker to claim 29, wherein the radiant is floor mounted.

32. The radiant section of a fired heater chemical cracker according to claim 29, wherein the radiant is hung directly from a support used to anchor the coil at a "U" bend.

33. A method of thermally treating a fluid hydrocarbon comprising passing the hydrocarbon through the radiant section of a fired heater according to claim 29, at a temperature from 800° C. to 1100° C.

34. The method according to claim 33, wherein the hydrocarbon is selected from naphtha and $C_{2-4}$ paraffins and the time of treatment is from 0.001 seconds to 0.1 seconds.

35. The radiant section of a fired heater chemical cracker to claim 28, wherein the radiant is horizontal.

36. A method of thermally treating a fluid hydrocarbon comprising passing the hydrocarbon through the radiant section of a fired heater according to claim 35, at a temperature from 800° C. to 1100° C.

37. The method according to claim 36, wherein the hydrocarbon is selected from naphtha and $C_{2-4}$ paraffins and the time of treatment is from 0.001 seconds to 01 seconds.

38. A method to improve the uniformity of circumferential temperature distribution in a tube in the radiant section of a fired heater comprising placing a radiant according to claim 1 adjacent said tube.

39. A method to improve the uniformity of circumferential heat flux to a tube in the radiant section of a fired heater comprising placing a radiant according to claim 1 adjacent said tube.

40. A cracking furnace comprising a radiant section having cracking coils spaced in a pattern in which a coil view factor relative to the wall is altered by presence of an adjacent coil, wherein a radiant according to claim 1, is position proximate at least a pair of adjacent coils to increase the radiant energy directed to the surface of said coils.

* * * * *